United States Patent
Han et al.

(10) Patent No.: US 11,675,497 B2
(45) Date of Patent: Jun. 13, 2023

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Geng Han, Beijing (CN); Tao Chen, Beijing (CN); Jian Gao, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/349,735

(22) Filed: Jun. 16, 2021

(65) Prior Publication Data
US 2022/0342546 A1    Oct. 27, 2022

(30) Foreign Application Priority Data

Apr. 21, 2021 (CN) .......................... 202110432823.1

(51) Int. Cl.
    *G06F 3/06* (2006.01)
(52) U.S. Cl.
    CPC .......... *G06F 3/0604* (2013.01); *G06F 3/0659* (2013.01); *G06F 3/0689* (2013.01)
(58) Field of Classification Search
    None
    See application file for complete search history.

(56) References Cited

U.S. PATENT DOCUMENTS

| | | | | |
|---|---|---|---|---|
| 11,169,879 B2* | 11/2021 | Yamamoto | .......... | G06F 11/1076 |
| 2003/0074527 A1* | 4/2003 | Burton | .................. | G06F 3/0601 |
| | | | | 711/114 |
| 2007/0118689 A1* | 5/2007 | Hyde, II | .............. | G06F 3/0689 |
| | | | | 711/114 |
| 2014/0317447 A1* | 10/2014 | Colgrove | .............. | G06F 11/108 |
| | | | | 714/6.24 |
| 2014/0351512 A1* | 11/2014 | Xu | ........................ | G06F 3/0631 |
| | | | | 711/114 |
| 2018/0088857 A1* | 3/2018 | Gao | ....................... | G06F 3/0644 |
| 2018/0095676 A1* | 4/2018 | Zhao | ..................... | G06F 3/0611 |
| 2019/0042407 A1* | 2/2019 | Gao | ....................... | G06F 3/0688 |

* cited by examiner

*Primary Examiner* — Stephanie Wu
(74) *Attorney, Agent, or Firm* — Womble Bond Dickinson (US) LLP

(57) ABSTRACT

Embodiments of the present disclosure relate to a method, an electronic device, and a computer program product for managing a storage system. The method includes: determining multiple storage units provided by multiple storage devices, each storage unit in the multiple storage units having a storage space allocated from a first number of storage devices among the multiple storage devices; dividing the multiple storage units into at least one storage unit group based on a total number of the multiple storage devices and the first number, each storage unit group in the at least one storage unit group including a second number of storage units; and storing, based on a logical address of to-be-stored data, the to-be-stored data into the at least one storage unit group. Embodiments of the present disclosure can allocate storage resources more reasonably and thus improve the performance of a storage system for processing sequential data.

18 Claims, 7 Drawing Sheets

METHOD, DEVICE, AND COMPUTER PROGRAM PRODUCT FOR MANAGING STORAGE SYSTEM

CROSS-REFERENCE TO RELATED APPLICATION

This patent application claims priority, under 35 U.S.C. § 119, of Chinese Patent Application No. 202110432823.1, filed Apr. 21, 2021, which is incorporated by reference in its entirety.

TECHNICAL FIELD

Embodiments of the present disclosure generally relate to the field of data storage, and in particular, to a method, a device, and a computer program product for managing a storage system.

BACKGROUND

With the development of data storage technologies, various data storage devices have been able to provide users with increasingly high data storage capabilities, and the data access speed has also been greatly improved. While the data storage capabilities are improved, users also put forward increasingly high requirements for the performance of storing sequential data (e.g., input/output (I/O) data streams).

Redundant array of independent disks (RAID) is commonly used in a storage system for data storage. In this RAID, disks are a logical concept and can be distributed on different storage devices in the storage system. However, when RAID is used to store sequential I/O data streams, it is usually impossible to make full use of each storage device in the storage system, which limits the performance of the storage system for sequential I/O storage.

SUMMARY OF THE INVENTION

Embodiments of the present disclosure provide a method, a device, and a computer program product for managing a storage system.

In a first aspect of the present disclosure, a method for managing a storage device is provided. The method includes: determining multiple storage units provided by multiple storage devices, each storage unit in the multiple storage units having a storage space allocated from a first number of storage devices among the multiple storage devices; dividing the multiple storage units into at least one storage unit group based on a total number of the multiple storage devices and the first number, each storage unit group in the at least one storage unit group including a second number of storage units; and storing, based on a logical address of to-be-stored data, the to-be-stored data into the at least one storage unit group.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: determining multiple storage units provided by multiple storage devices, each storage unit in the multiple storage units having a storage space allocated from a first number of storage devices among the multiple storage devices; dividing the multiple storage units into at least one storage unit group based on a total number of the multiple storage devices and the first number, each storage unit group in the at least one storage unit group including a second number of storage units; and storing, based on a logical address of to-be-stored data, the to-be-stored data into the at least one storage unit group.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

In the accompanying drawings, identical or corresponding reference numerals represent identical or corresponding parts.

DETAILED DESCRIPTION

Preferred embodiments of the present disclosure will be described in more detail below with reference to the accompanying drawings. While the preferred embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

In the context of the present disclosure, a storage system may be a RAID-based storage system. The RAID-based storage system may combine multiple storage devices into one disk array. By providing redundant storage devices, the reliability of the entire disk group may be significantly greater than that of a single storage device. RAID may provide various advantages over a single storage device, such as enhanced data integration, enhanced fault tolerance, increased throughput or capacity, and so on. There are multiple standards for RAID, such as RAID-1, RAID-2, RAID-3, RAID-4, RAID-5, RAID-6, RAID-10, RAID-50, and so on.

Figure 1:
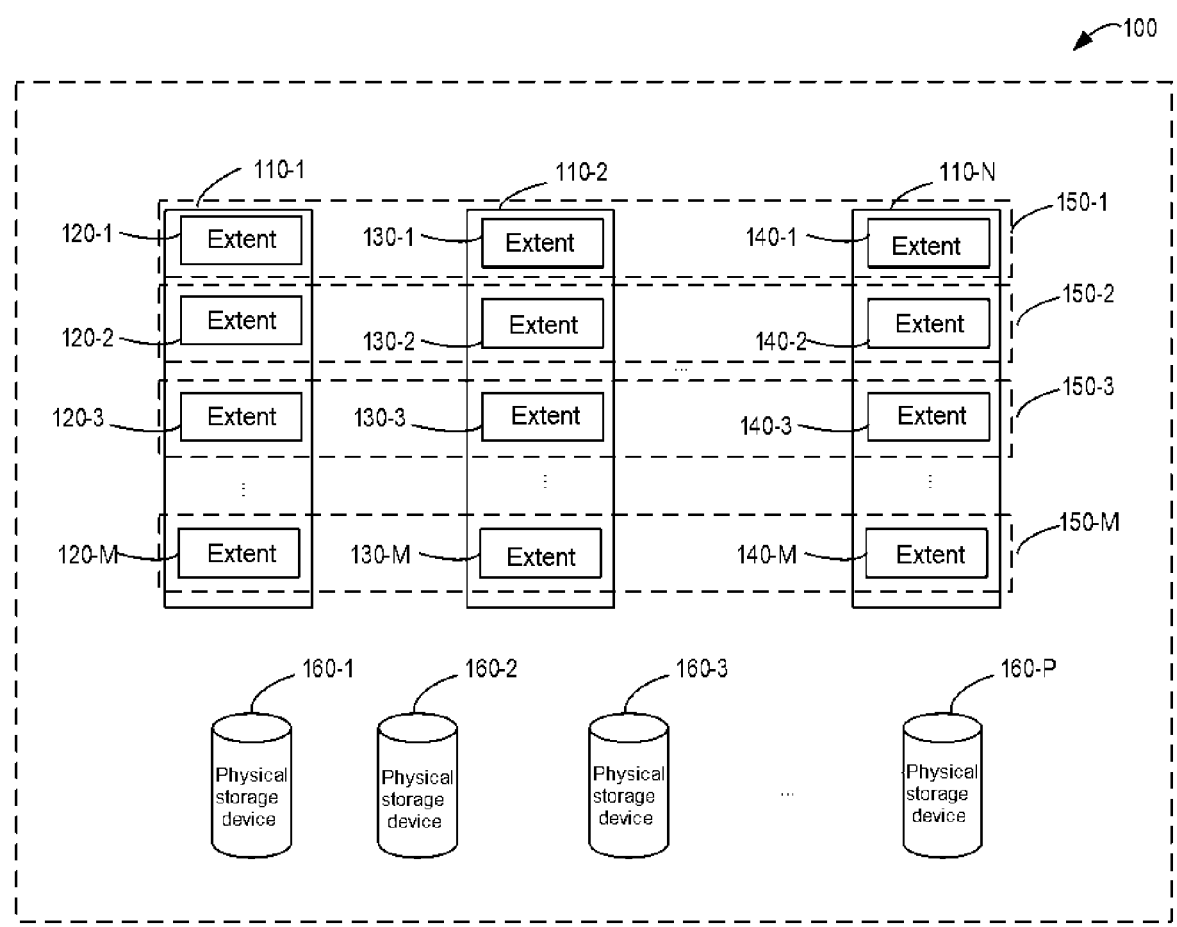
FIG. 1 illustrates a schematic diagram of an example system in which some embodiments of the present disclosure can be implemented.

FIG. 1 schematically illustrates a schematic diagram of storage system 100 in which a method of the present disclosure may be implemented. In storage system 100 shown in FIG. 1, multiple storage devices 160-1, 160-2, 160-3, . . . , and 160-P are included, with P being an integer greater than 1. For ease of discussion, storage devices 160-1, 1602, 160-3, . . . , and 160-P are sometimes collectively or individually referred to as storage device 160. In some embodiments, examples of storage device 160 may include, but are not limited to, a digital versatile disk (DVD), a Blue-ray disk (BD), an optical disk (CD), a floppy disk, a hard disk device, a tape drive, an optical drive, a hard disk drive (HDD), a solid storage device (SSD), or other hard disk devices.

FIG. 1 also illustrates that storage system 100 is divided into multiple disks 110-1, 110-2, . . . , and 110-N. Hereinafter, for ease of discussion, disks 110-1, 110-2, . . . , and 110-N are sometimes collectively or individually referred to as disk 110. For example, for storage system 100 based on RAID 6 (6+2), N may be 8. For another example, for storage system 100 based on RAID 4 (4+1), N may be 5. It should be understood that N may be any suitable integer greater than 1.

Herein, disk 110 refers to a virtual and logical storage disk. Although the specific correspondence between disks 110 and storage devices 160 is not shown in FIG. 1, it should be understood that disks 110 can be distributed on different storage devices 160 (e.g., hard disks) in storage system 100. For example, disks 110 can be distributed on certain storage device 160 in storage system 100, or they can be distributed on some storage devices 160 in storage system 100. Disk 110 can be divided into multiple extents. For example, disk 110-1 can be divided into extents 120-1, 120-2, 120-3, . . . , and 120-M (collectively or individually referred to as extent 120), with M being an integer greater than 1. Disk 110-2 can be divided into extents 130-1, 130-2, 130-3, . . . , and 130-M (collectively or individually referred to as extent 130), with M being an integer greater than 1. Disk 110-N can be divided into extents 140-1, 140-2, 140-3, . . . , and 140-M (collectively or individually referred to as extent 140), with M being an integer greater than 1. Each extent 120, extent 130, . . . , and extent 140 has the same storage space size.

Each extent in storage system 100 is also divided into multiple storage units 150. For example, storage unit 150-1 may include extent 120-1 of disk 110-1, extent 130-1 of disk 110-2, . . . , and extent 140-1 of disk 110-N. Storage unit 150-2 may include extent 120-2 of disk 110-1, extent 130-2 of disk 110-2, . . . , and extent 140-2 of disk 110-N. Storage unit 150-3 may include extent 120-3 of disk 110-1, extent 130-3 of disk 110-2, . . . , and extent 140-3 of disk 110-N. Storage unit 150-M may include extent 120-M of disk 110-1, extent 130-M of disk 110-2, . . . , and extent 140-M of disk 110-N.

For each storage unit 150, the extents included therein respectively correspond to storage spaces allocated by different storage devices 160. In other words, the storage space of storage unit 150 is provided by N physical storage units 160. In addition, storage units 150 can be regarded as a storage space with contiguous logical addresses for use by a file system or other storage applications to store data.

During the use of storage system 100, it is often necessary to store large amounts of sequential data (e.g., sequential I/O data streams). When the amount of the sequential data is particularly large, the number N of disks 110 (i.e., the width of the RAID) in storage system 100 will limit the capability of storage system 100 for processing sequential data. Therefore, it is necessary to optimize the capability of storage system 100 for processing sequential data.

Figure 2:
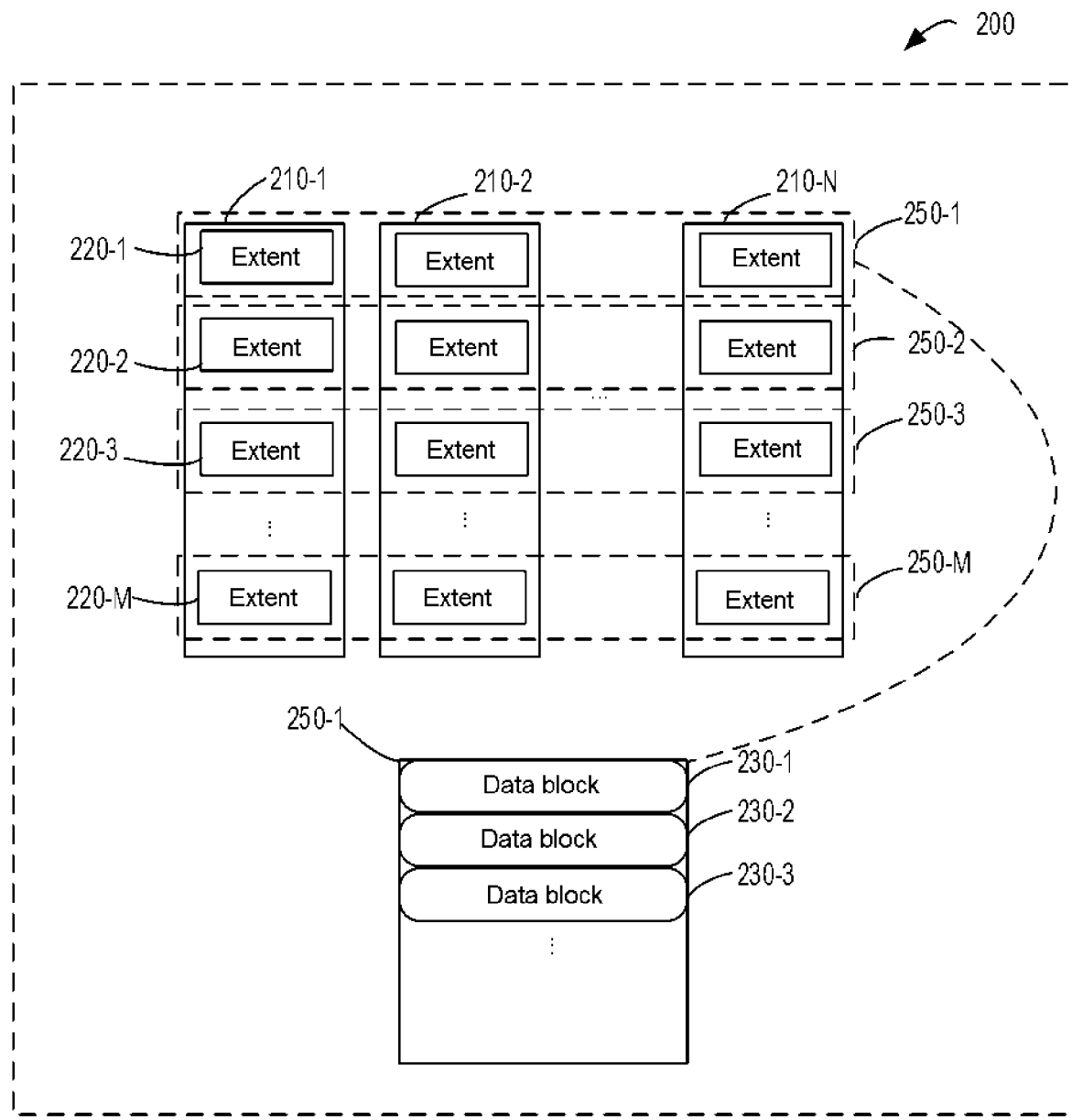
FIG. 2 illustrates a schematic block diagram of a conventional solution for storing sequential data.

FIG. 2 illustrates a conventional solution for processing sequential data by a storage system. As described in FIG. 2, storage system 200 is divided into disks 210-1, 210-2, . . . , and 210-N (collectively or individually referred to as "disk 210"). Disk 210 include multiple extents. For example, disk 210-1 includes extents 220-1, 220-2, 220-3, . . . and 220-M (collectively or individually referred to as "extent 220"). As shown in FIG. 2, the extents in storage system 200 are also divided into multiple storage units 250-1, 250-2, . . . , and 250-M (collectively or individually referred to as "storage unit 250").

For storage unit 250, the extents included therein respectively correspond to storage spaces allocated by different storage devices. In other words, the storage space of storage unit 250 is provided by N physical storage units. Storage unit 250 can be regarded as a storage space with contiguous logical addresses.

When storage system 200 needs to process a large amount of data, with reference to storage unit 250-1 illustrated in detail in FIG. 2, sequential data is stored sequentially into storage unit 250-1 in the order of logical addresses from small to large until the storage space of storage unit 250-1 is fully occupied. For example, data block 230-1 (e.g., it may be an I/O data stripe of 4.5 MB) with the smallest logical address is stored first to storage unit 250-1, followed by data block 230-2 with the second smallest logical address, and then data block 230-3, . . . When storage unit 250-1 is fully occupied, storage system 200 will store data into storage units 250-2, 250-3, . . . , and 250-M in the order of logical addresses from small to large in a similar manner.

In a conventional solution, when the storage space of certain storage unit 250 is not fully occupied, storage system 200 will not use other storage units 250 to process data. For example, when the storage space of storage unit 250-1 is not fully occupied, storage system 200 will not use other storage units 250 to process data. In the process of using only storage unit 250, only the N storage devices in storage system 200 that provide storage space for storage unit 250 are used, and none of the other storage devices are used. When the amount of the sequential data is particularly large, the workload of the N storage devices providing storage space for storage unit 250 is very high during this period, while the other storage devices are in an unnecessary idle state.

This conventional solution can only utilize a limited number of storage devices simultaneously, thus limiting the maximum number of sequential data that can be processed. In addition, only a small number of storage devices are utilized simultaneously while others are in an idle state, which is not conducive to the allocation of storage resources of the storage system. In addition, such solution may also cause some storage devices to be too busy compared with others, which can easily cause damage to the storage devices.

Embodiments of the present disclosure provide a solution for managing a storage system to solve one or more of the above problems and other potential problems. In this solution, multiple storage units are divided into at least one storage unit group based on the total number of storage devices and the first number of storage devices spanned by the storage space of each storage unit. The solution further includes storing to-be-stored data into the at least one storage unit group, the storage space of each storage unit group in the at least one storage unit group being allocated by storage devices of which the number is greater than the first number. In this way, sequential data can be processed on more storage devices simultaneously, thus improving the data processing performance of the storage system. In addition, it is possible to allocate the storage space of the storage system more reasonably, thereby avoiding damage to the storage device caused by overuse.

Figure 3:
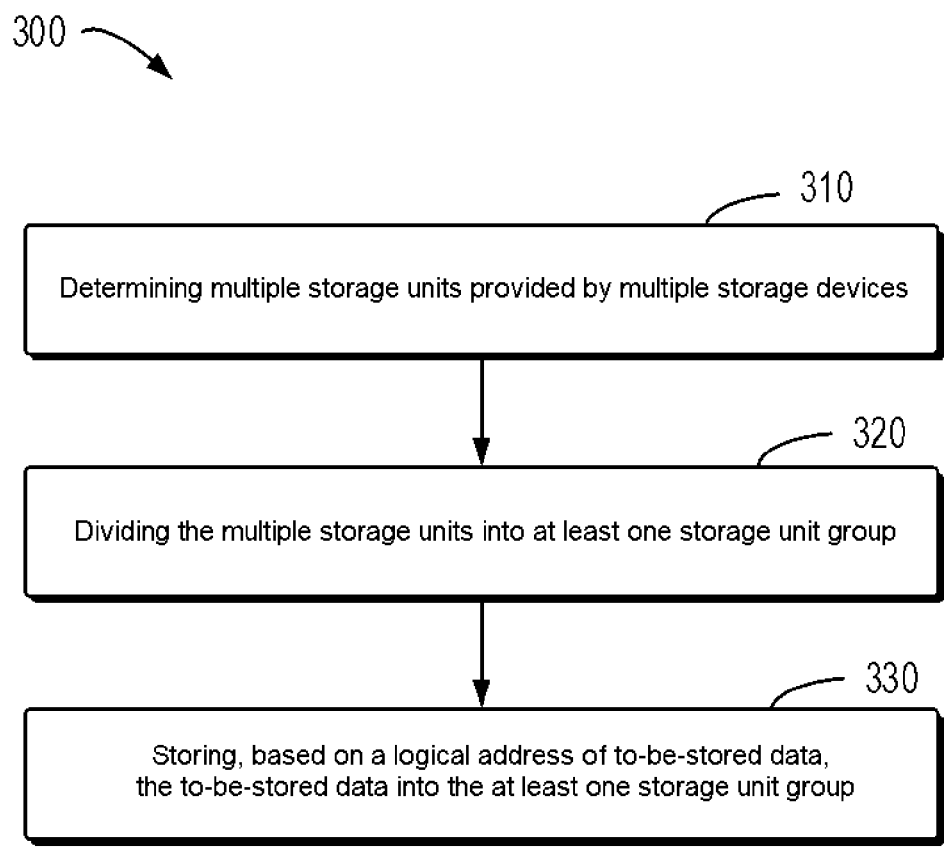
FIG. 3 illustrates a flow chart of an example method for managing a storage system according to some embodiments of the present disclosure.

The fundamental principles and several example embodiments of the present disclosure will be described in detail below with reference to the accompanying drawings. FIG. 3 illustrates a flow chart of example method 300 for managing storage system 100 according to embodiments of the present disclosure. Method 300 may be, for example, executed by storage system 100 as shown in FIG. 1. It should be understood that method 300 may further include an additional action that is not shown and/or may omit an action that is shown. The scope of the present disclosure is not limited in this regard. Method 300 is described in detail below in connection with FIG. 1.

As shown in FIG. 3, at 310, multiple storage units 150 provided by multiple storage devices 160 are determined. Each storage unit 150 of multiple storage units 150 has a storage space provided by a first number (i.e., N in FIG. 1) of storage devices 160 of multiple storage devices 160.

For example, storage system 100 may include 16 storage devices 160, and storage spaces of the 16 storage devices 160 can be divided into extents of a predetermined size, respectively, for example, 32 GB for each extent. It should be understood that this is merely illustrative, and the extents can be set to any suitable predetermined size. M storage units 150 provided by multiple (e.g., 16) storage devices 160 are determined. Each storage unit 150 has extents provided by each of N (e.g., 8 for RAID 6) storage devices 160 among multiple storage devices 160.

In some embodiments, the total number of storage units 150 can be determined according to the predetermined size of the storage space provided by storage devices 160 and the predetermined size of each extent. For example, if the total number of storage devices 160 in storage system 100 is 16, each storage device 160 is predetermined to provide 128 GB of storage space, and each extent has a predetermined size of 32 GB, then for RAID 6 (i.e., N is equal to 8), the total number M of storage units 150 that can be determined is 8. In some embodiments, the total number of storage units 150 can also be arbitrarily selected. For example, the total number M of storage units 150 can be selected to be 24. It should be understood that the 16, 24, 128 GB, 32 GB, etc. listed above are merely examples and do not limit the present invention in any way. In some embodiments, storage devices 160 of other total numbers and storage spaces can be selected and allocated in other ways.

At 320, multiple storage units 150 are divided into at least one storage unit group based on the total number of multiple storage devices 160 and the first number described above. Each storage unit group of the at least one storage unit group includes a second number of storage units 150. For example, if the total number of multiple storage devices 160 is 16 and the first number is 8, the second number can be determined to be 2. That is, M (e.g., 8) storage units 150 are divided into groups each having two storage units, thus obtaining 4 storage unit groups in total.

In some embodiments, for each storage unit group of the at least one storage unit group, this storage unit group has a storage space allocated from a third number of storage devices 160 among multiple storage devices 160. The third number is the product of the first number and the second number. For example, in the example described above, the first number is 8, and the second number is 2, then the third number is 16. That is, each storage unit group has a storage space allocated from 16 storage devices 160. In this way, different storage devices 160 can be utilized to a greater extent to provide storage space for the storage unit group.

Figure 4:
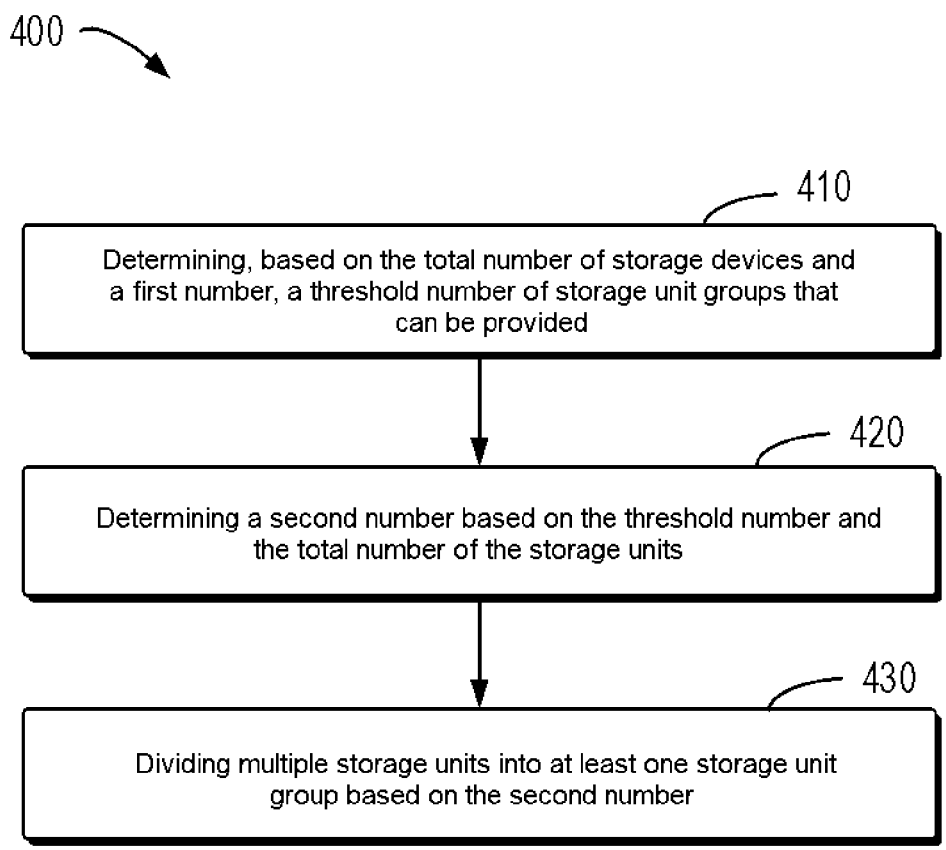
FIG. 4 illustrates a flow chart of an example method for dividing to obtain storage unit groups according to some embodiments of the present disclosure.

In some embodiments, method 400 illustrated in FIG. 4 can be used to divide multiple storage units 150 into at least one storage unit group. Several embodiments of dividing to obtain at least one storage unit group will be described in more detail below in connection with FIG. 4.

At 330, based on a logical address of to-be-stored data, the to-be-stored data is stored into the at least one storage unit group. For example, the to-be-stored data is stored sequentially to a storage unit in a storage unit group in the at least one storage unit group in the order of logical addresses of the to-be-stored data from small to large.

In some embodiments, an identifier for a storage unit group is determined based on the logical address of the to-be-stored data, the size of storage unit 150, and the second number. The to-be-stored data is stored to a target storage unit group with the identifier in the at least one storage unit group. For example, the identifier can be determined by the following Equation (1):

$$PER\_GROUP\_ID = IO\_LBA / (PER\_SIZE * NUMBER\_OF\_PERS\_IN\_THE\_GROUP) \quad (1)$$

where PER_GROUP_ID indicates the identifier of the storage unit group, IO_LBA indicates the logical address of the to-be-stored data, PER_SIZE indicates the size of storage unit 150, and NUMBER_OF_PERS_IN_THE_GROUP indicates the second number.

For example, in the example described above in connection with 320, the size of storage unit 150 is the product of 32 GB and the first number N (i.e., 8). The second number is 2. According to Equation (1), it is possible to determine to which storage unit group the to-be-stored data will be stored. For example, if it is determined that the identifier PER_GROUP_ID is 0, the to-be-stored data can be stored in the storage unit group with the identifier 0.

Figure 5:
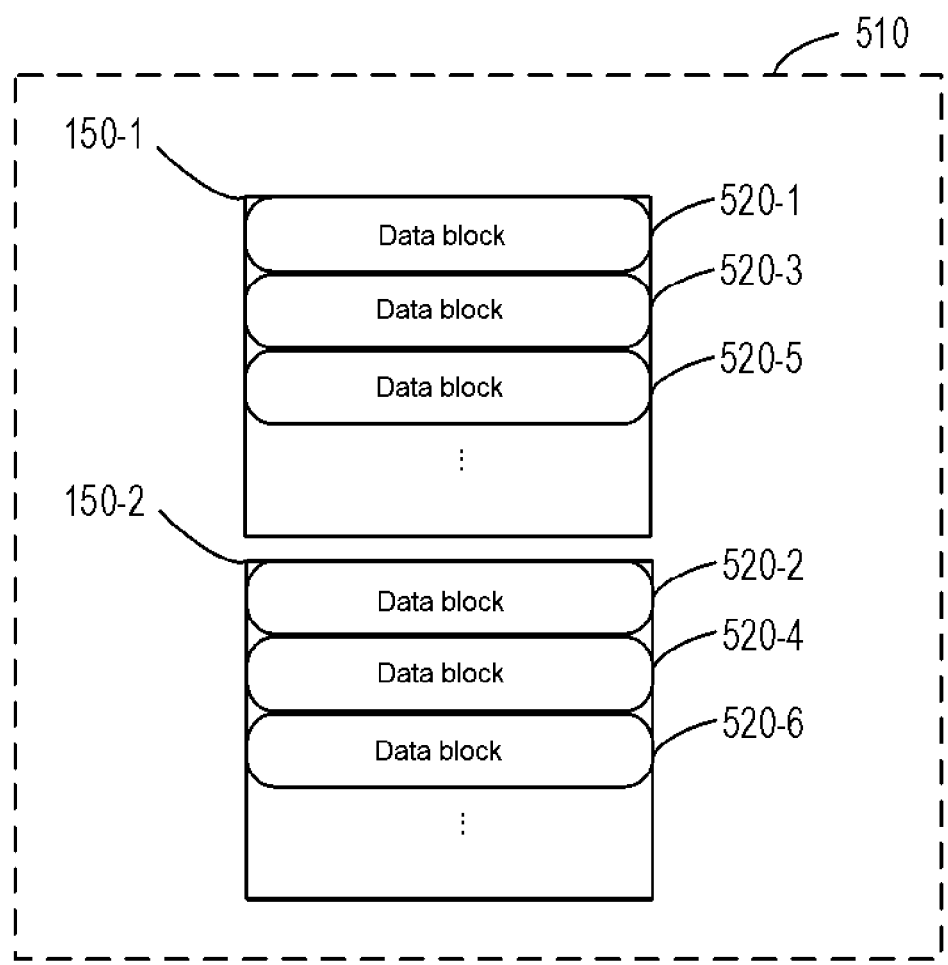
FIG. 5 illustrates a schematic diagram for storing data blocks sequentially into storage unit groups according to some embodiments of the present disclosure.

In some embodiments, multiple sequential data blocks included in the to-be-stored data can be stored, in an interlaced manner, to a second number of storage units 150 in the target storage unit group. An example diagram of storing to-be-stored data to a target storage unit group of storage system 100 according to some embodiments will be described below with reference to FIG. 5. As shown in FIG. 5, target storage unit group 510 is shown. Target storage unit group 510 includes storage unit 150-1 and storage unit 150-2. It should be understood that, for the purpose of clarity, FIG. 5 only shows target storage unit group 510, but it should be understood that storage system 100 may also include other storage unit groups.

As shown in FIG. 5, data block 520-1 (e.g., it may be a data stripe of 4.5 MB) with the smallest logical address among the multiple data blocks can be stored to storage unit 150-1. Then, data block 520-2 with the second smallest logical address is stored to storage unit 150-2. Afterwards, data block 520-3 is stored to storage unit 150-1, data block 520-4 to storage unit 150-2, data block 520-5 to storage unit 150-1, and data block 520-6 to storage unit 150-2 sequentially in order, . . . , until the storage spaces of storage unit 150-1 and storage unit 150-2 are fully occupied.

In some embodiments, the following Equations (2)-(4) may be used in connection with the previously described Equation (1) to determine the storage location of a data block of the to-be-stored data in the at least one storage unit group:

$$LBA\_OFFSET\_IN\_PER\_GROUP=IO\_LBA \% \\ (PER\_SIZE*NUMBER\_OF\_PERS\_IN\_THE\_GROUP) \qquad (2)$$

$$PER\_ID=PER\_GROUP\_ID*NUMBER\_OF\_PERS\_ \\ IN\_THE\_GROUP+LBA\_OFFSET\_IN\_PER\_ \\ GROUP/LRB \% NUMBER\_OF\_PERS\_ \\ IN\_THE\_GROUP \qquad (3)$$

$$LBA\_OFFSET\_IN\_PER=LBA\_OFFSET\_IN\_PER\_GROUP/ \\ (LRB*NUMBER\_OF\_PERS\_IN\_THE\_GROUP)* \\ LRB+IO\_LBA \% LRB \qquad (4)$$

where LBA_OFFSET_IN_PER_GROUP indicates the offset of the data block in the target storage unit group, IO_LBA indicates the logical address of the data block, PER_SIZE indicates the size of storage unit 150, NUMBER_OF_PERS_IN_THE_GROUP indicates the second number, and PER_GROUP_ID indicates an identifier of the storage unit group. LRB indicates the sequence of a data block. For example, as shown in FIG. 5, LRB for data block 520-1 is 1, LRB for data block 520-2 is 2, . . . . The determined PER_ID indicates the identifier of a target storage unit in the target storage unit, wherein the data blocks are to be stored into the target storage unit with this identifier. The determined LBA_OFFSET_IN_PER indicates the address offset of the data block in the target storage unit of the target storage unit group. Through the foregoing calculations, the to-be-stored data can be stored in at least one storage unit group of storage system 100.

In the above manner, the sequential data can be stored into a storage unit group of storage system 100 instead of being stored to only one storage unit. The storage unit group can be allocated a storage space by more storage devices. In this manner, the number of storage devices that can be utilized is increased, and thus the allocation of storage resources is optimized. In addition, by this way, the workload of some storage devices can be reduced, so that they will not be damaged due to excessive busyness. In this manner, the performance of the storage system can be improved, especially for the performance of processing sequential I/O data streams.

Method 400 for dividing to obtain at least one storage unit group according to some embodiments is described with reference to FIG. 4. Method 400 may be regarded as an example implementation of block 320 in method 300. Method 400 may be, for example, executed by storage system 100 as shown in FIG. 1. It should be understood that method 400 may also be performed by other suitable devices or apparatuses. Method 400 may include additional actions not shown and/or may omit actions shown, and the scope of the present disclosure is not limited in this regard. For ease of description, process 400 will be described with reference to FIG. 1.

At 410, based on the total number of multiple storage devices 160 and the first number, a threshold number of storage unit groups that can be provided by multiple storage devices 160 is determined. The second number may be an integer not greater than the threshold number. For example, the following Equation (5) can be used to determine the threshold number:

$$T=round\_down(NUM\_PHY\_DISK,N)/N \qquad (5)$$

where NUM_PHY_DISK indicates the total number of storage devices 160, N indicates the first number, round_down indicates the round-down operation, and T indicates the threshold number. For example, if the total number of storage devices 160 in storage system 100 is 50 and N is 8, then T=round_down (50, 8)/8=48/8=6. That is, the threshold number of storage unit groups is 8.

By determining the threshold number of storage unit groups and determining the second number as an integer not greater than the threshold number, it is possible to ensure that various storage units in the same storage unit group are respectively allocated storage spaces by different storage devices 160. That is, there is no case where an extent of a storage unit in a storage unit group and an extent of another storage unit in the same storage unit group are allocated by the same storage device 160.

In this manner, it is possible to avoid a storage unit group having multiple extents allocated by the same storage device 160. In this way, it is possible to avoid making a certain storage device overburdened caused by allocating multiple extents to a certain storage unit group. In this way, storage resources can be allocated more reasonably to avoid the failure or damage of storage devices due to excessive workload.

At 420, a second number is determined based on the threshold number and the total number (i.e., M) of multiple storage units 150. For example, the following Equation (6) can be used to determine the second number:

$$Q=upper\_bound(NUM\_PER\_IN\_VDG\_FACTORS, T) \qquad (6)$$

where NUM_PER_IN_VDG_FACTORS indicates factors of the total number M of storage units 150, T indicates the threshold number, upper_bound indicates the upward lookup for a boundary value, and Q indicates the second number. For example, if the total number of storage units 150 is 24, it has factors 2, 3, 4, 6, 8, and 12. Then, the second number can be determined as: Q=upper_bound ([2, 3, 4, 6, 8, 12], 6)=6.

In this way, the second number can be determined as a value such that all storage units 150 can be divided into an integer number of storage unit groups according to the second number. In this manner, it is possible to utilize all storage units 150, thus avoiding the waste of storage resources. In turn, the storage resources can be more fully and reasonably utilized, thus further improving the performance of the storage system.

In addition, by determining the second number as the maximum number that satisfies the threshold number and enables storage units 150 to be divided into an integer number of storage unit groups, it is possible to make the number of storage units utilized by a storage unit group as large as possible. In some embodiments, it is also possible to make the second number as large as possible by selecting the total number M of storage units 150 reasonably. For example, compared with a total of 25 storage units 150, 24 storage units can be relatively easily divided into a larger second number of storage unit groups. Therefore, a reasonable selection of the total number of storage units 150 can also cause a better division into storage unit groups. In turn, the storage resources can be more reasonably utilized, thus improving the performance of the storage system.

During use, the number of storage devices 160 may be increased. In some embodiments, the second number may be updated in response to an increase in the number of storage devices 160. For example, the process described with reference to FIG. 4 may be used to update the second number. It should be understood that other approaches may also be used to update the second number. If there is no change in the updated second number, no change is made to the existing storage unit groups. Only newly added storage devices 160 are used to allocate multiple newly added storage units 150 and to divide them into at least one newly added storage unit groups according to the second number.

If the updated second number is greater than the second number before the update, existing storage unit 150 and new storage device 150 allocated by newly added storage device 160 are used to determine the at least one updated storage unit group. Each storage unit group of the at least one updated storage unit group has the updated second number of storage units.

In some embodiments, determining the at least one updated storage unit group includes determining, for each storage unit 150, whether this storage unit 150 stores data. If storage unit 150 has stored data, this storage unit 150, other storage units 150 in a storage unit group before the update corresponding to this storage unit 150, and a fourth number of storage units 150 having no data stored are determined as an updated storage unit group. The fourth number is the difference between the updated fourth number and the fourth number before the update.

Figure 6:
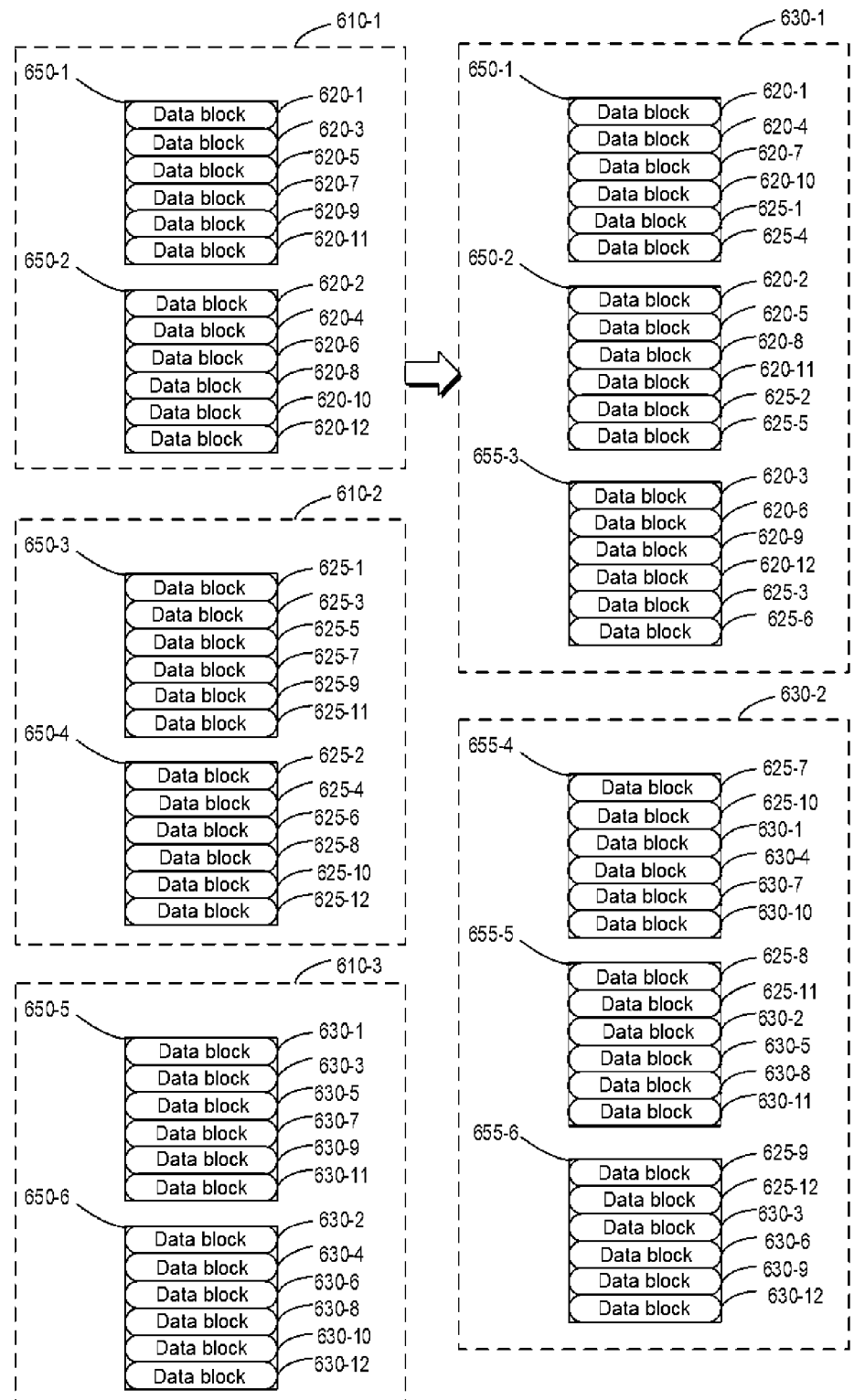
FIG. 6 illustrates a schematic diagram of updating at least one storage unit group and migrating stored data according to some embodiments of the present disclosure.

FIG. 6 illustrates a schematic diagram of updating at least one storage unit group according to embodiments of the present disclosure. For example, if the total number of storage devices 160 before the update is 16 and the total number of storage devices after the update is 24, then the second number before the update is 2 and the second number after the update is 3. If the total number of storage units is 24, there will be 8 storage unit groups after the update. FIG. 6 illustrates storage unit groups 610-1, 610-2, and 610-3 (collectively or individually referred to as storage unit group 610) before the update. It should be understood that although 3 storage unit groups 610 are illustrated in FIG. 6, storage system 100 may also have fewer or more storage unit groups 610. FIG. 6 also illustrates storage unit groups 630-1 and 630-2 (collectively or individually referred to as storage unit group 630) after the update. It should be understood that although 2 storage unit groups 630 after the update are illustrated in FIG. 6, storage system 100 may also have fewer or more storage unit groups 630.

As shown in FIG. 6, storage unit group 610-1 before the update includes storage unit 650-1 and storage unit 650-2. Both storage unit 650-1 and storage unit 650-2 store data. Storage unit group 630-1 after the update is composed of storage unit 650-1, storage unit 650-2, and storage unit 655-3 that has not previously stored data. Storage unit 655-3 may be a storage unit provided by newly added storage device 160, or may be a previously unused storage unit.

FIG. 6 also illustrates corresponding storage locations of data blocks of stored data before the update in at least one updated storage unit group 630. In some embodiments, it is possible to determine, based on logical addresses of multiple data blocks included in the stored data, the size of the storage unit, and the updated second number, the corresponding storage locations of the data blocks of the stored data in at least one updated storage unit group 630. For example, the process described with reference to FIG. 5 and Equations (1)-(4) can be used to determine the corresponding storage locations of the data blocks of the stored data in at least one updated storage unit groups 630.

Based on the determined updated storage locations of the multiple data blocks, the multiple data blocks are sequentially migrated to at least one updated storage unit group 630 in the order of logical addresses from small to large. For example, as shown in FIG. 6, data block 620-1 and data block 620-2 do not need to be migrated. Data block 620-3 is migrated to storage unit 655-3 of updated storage unit group 630-1, and data block 620-4 is migrated to storage unit 650-1, . . . FIG. 6 also shows the respective storage locations of other data blocks after migration, which will not be described in detail here. Although FIG. 6 does not show the connection lines of the direct correspondence between the data blocks in the storage unit groups before the update and the corresponding data blocks in the updated storage unit groups for the sake of clarity, the corresponding symbols thereof indicate the corresponding storage locations of the data blocks. It should be understood that, for purposes of illustration, the storage units in FIG. 6 each store 6 data blocks, but this is merely illustrative and does not limit the invention in any way. Any appropriate number of data blocks can be stored in a storage unit.

In some embodiments, a checkpoint can also be set during the migration of the stored data. Data blocks before the checkpoint are stored using the updated storage unit groups, and data blocks after the checkpoint are stored using the storage unit groups before the update. For example, initially, the checkpoint is set at data block 620-1 (i.e., the storage location where the data block with the smallest logical address is located) of storage unit 650-1 of storage unit group 610-1, and the data blocks are sequentially migrated in the order of their logical addresses from small to large. Whenever a data block is migrated, the checkpoint is moved to the next data block. In addition, if a certain data block is an invalid data block (for example, it can be indicated by a client terminal that this data block is an invalid data block), this data block will be skipped and will not be migrated, and instead, the checkpoint is moved directly to the next data block.

As shown in FIG. 6, when all the data blocks of storage unit group 610-1 are migrated, storage unit group 630-1 is not fully occupied. The checkpoint is moved to data block 625-1 of storage unit 630-1 of next storage unit group 610-2, and the data blocks of storage unit group 610-2 are migrated in sequence. For example, data block 625-1 is migrated to storage unit 650-1. After data block 625-6 of storage unit 650-3 is migrated to storage unit 655-3, storage unit group 630-1 is fully occupied. After that, other data blocks in storage unit 110-2 will be migrated to next updated storage unit group 630-2. In some embodiments, storage unit group 630-2 may be composed of storage unit 650-3, storage unit 650-4, and another storage unit that stores no data (not shown in FIG. 6).

Alternatively, storage unit group 630-2 may also be composed of unused storage unit 655-4, storage unit 655-5, and storage unit 655-6. The remaining data blocks in storage unit group 610-2 will be migrated to storage unit group 630-2 in sequence. In an example in which storage unit group 630-2 is composed of unused storage units, when the remaining data blocks of storage unit group 610-2 are all migrated to storage unit group 630-2, no more data blocks are stored in storage unit 650-3 and storage unit 650-4. Therefore, in the subsequent data block migration process, storage unit 650-3 and storage unit 650-4 can be used as unused storage units to form a new storage unit group.

Additionally or alternatively, the data block migration process described above may perform backend operations during a time period when storage system 100 is not busy. In addition, if only sparse data is stored in the at least one storage unit group, the above data block migration process can be combined with a garbage collection process.

By performing the above data block migration process, sequential data can be stored in at least one updated storage unit group in the order of logical addresses from small to large. After data migration, all sequential data is stored according to the at least one updated storage unit group, and the updated storage unit group is allocated storage spaces by a larger number of storage devices. As a result, storage resources can be better allocated and the overall performance of the storage system can be improved.

Figure 7:
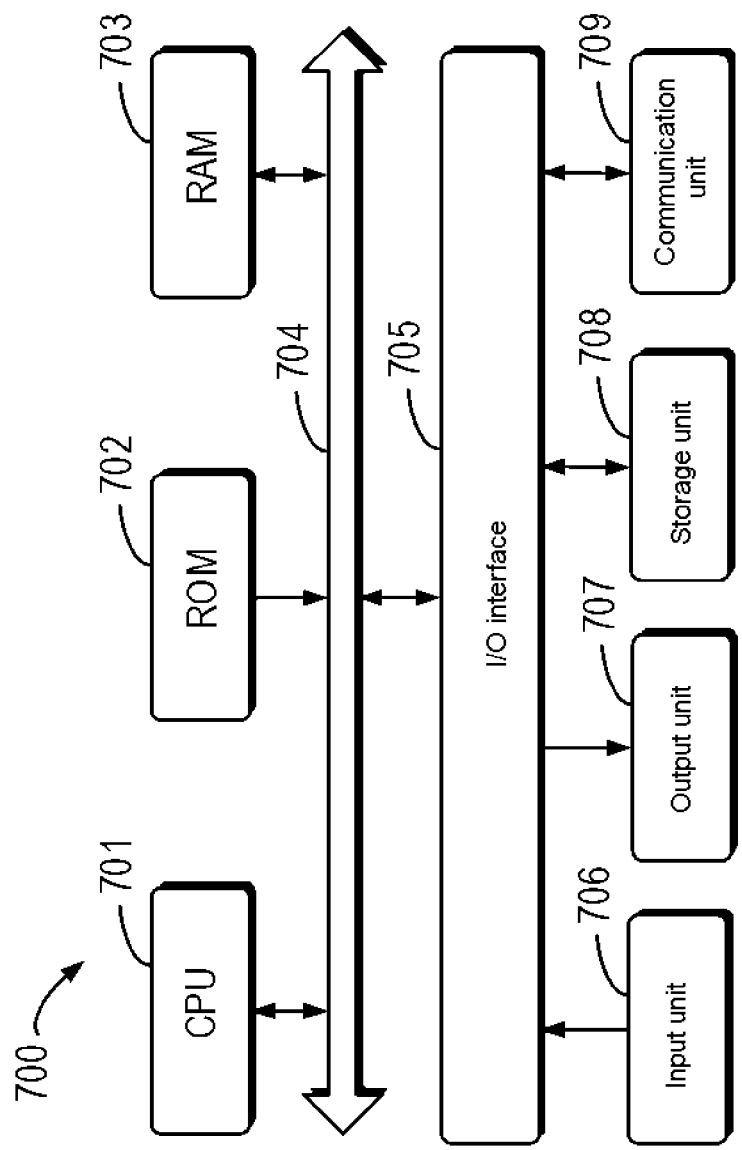
FIG. 7 illustrates a schematic block diagram of an example device that can be used to implement embodiments of the present disclosure.

FIG. 7 illustrates a schematic block diagram of example device 700 that can be used to implement the embodiments of the present disclosure. For example, storage system 100 as shown in FIG. 1 may be implemented by device 700. As shown in FIG. 7, device 700 includes central processing unit (CPU) 701 that may perform various appropriate actions and processing according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The various processes and processing described above, such as method 300 and/or 400, may be performed by processing unit 701. For example, in some embodiments, methods 300 and/or 400 may be implemented as a computer software program that is tangibly included in a machine-readable medium such as storage unit 708. In some embodiments, part or all of the computer program may be loaded and/or installed on device 700 via ROM 702 and/or communication unit 709. When the computer program is loaded into RAM 703 and executed by CPU 701, one or more actions of methods 300 and/or 400 described above can be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object-oriented programming languages such as Smalltalk, C++, and the like, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, including:
   determining multiple storage units provided by multiple storage devices, each storage unit in the multiple storage units having a storage space allocated from a first number of storage devices among the multiple storage devices;
   dividing the multiple storage units into at least one storage unit group based on a total number of the multiple storage devices and the first number, each storage unit group in the at least one storage unit group including a second number of storage units, wherein for each storage unit group in the at least one storage unit group, the storage unit group has a storage space allocated from a third number of storage devices among the multiple storage devices, the third number equaling the first number multiplied by the second number, wherein each storage unit within a single storage unit group has storage space allocated from a unique subset of the multiple storage device; and
   storing, based on a logical address of to-be-stored data, the to-be-stored data into the at least one storage unit group.

2. The method according to claim 1, wherein dividing the multiple storage units into the at least one storage unit group includes:
   determining, based on the total number of the multiple storage devices and the first number, a threshold number of storage unit groups that can be provided by the multiple storage devices;
   determining the second number based on the threshold number and the total number of the multiple storage units; and
   dividing the multiple storage units into the at least one storage unit group based on the second number.

3. The method according to claim 1, wherein storing, based on a logical address of the to-be-stored data, the to-be-stored data into the at least one storage unit group includes:
   determining an identifier for a storage unit group based on the logical address of the to-be-stored data, a size of the storage unit, and the second number; and
   storing the to-be-stored data to a target storage unit group with the identifier in the at least one storage unit group.

4. The method according to claim 3, wherein storing the to-be-stored data to a target storage unit group with the identifier in the at least one storage unit group includes:
   storing, in an interlaced manner, multiple sequential data blocks included in the to-be-stored data into a second number of storage units in the target storage unit group.

5. The method according to claim 1, further including:
   updating the second number in response to an increase in the total number of the multiple storage devices;
   determining whether the updated second number is greater than the second number before the update; and
   determining at least one updated storage unit group if it is determined that the updated second number is greater than the second number before the update, each storage unit group in the at least one updated storage unit group having the updated second number of storage units.

6. The method according to claim 5, wherein determining at least one updated storage unit group includes:
for each storage unit in the multiple storage units, determining whether the storage unit stores data; and
if it is determined that the storage unit has stored data, determining the storage unit, each of the other storage units in a storage unit group that included the storage unit before the update, and a fourth number of storage units having no data stored as an updated storage unit group, the fourth number being a difference between the updated second number and the second number before the update.

7. The method according to claim 5, further including:
determining a storage unit group included stored data before the update, wherein the stored data included multiple data blocks; and
migrating, based on logical addresses of multiple data blocks included in stored data before the update, a size of the storage unit, and the updated second number, the multiple data blocks sequentially to the at least one updated storage unit group in an order of the logical addresses from small to large.

8. An electronic device, including:
at least one processor; and
at least one memory storing computer program instructions, which when executed by the at least one processor, cause the electronic device to perform actions, the actions including:
determining multiple storage units provided by multiple storage devices, each storage unit in the multiple storage units having a storage space allocated from a first number of storage devices among the multiple storage devices;
dividing the multiple storage units into at least one storage unit group based on a total number of the multiple storage devices and the first number, each storage unit group in the at least one storage unit group including a second number of storage units, wherein for each storage unit group in the at least one storage unit group, the storage unit group has a storage space allocated from a third number of storage devices among the multiple storage devices, the third number equaling the first number multiplied by the second number, wherein each storage unit within a single storage unit group has storage space allocated from a unique subset of the multiple storage device; and
storing, based on a logical address of to-be-stored data, the to-be-stored data into the at least one storage unit group.

9. The electronic device according to claim 8, wherein dividing the multiple storage units into the at least one storage unit group includes:
determining, based on the total number of the multiple storage devices and the first number, a threshold number of storage unit groups that can be provided by the multiple storage devices;
determining the second number based on the threshold number and the total number of the multiple storage units; and
dividing the multiple storage units into the at least one storage unit group based on the second number.

10. The electronic device according to claim 8, wherein storing, based on a logical address of the to-be-stored data, the to-be-stored data into the at least one storage unit group includes:

determining an identifier for a storage unit group based on the logical address of the to-be-stored data, a size of the storage unit, and the second number; and
storing the to-be-stored data to a target storage unit group with the identifier in the at least one storage unit group.

11. The electronic device according to claim 10, wherein storing the to-be-stored data to a target storage unit group with the identifier in the at least one storage unit group includes:
storing, in an interlaced manner, multiple sequential data blocks included in the to-be-stored data into a second number of storage units in the target storage unit group.

12. The electronic device according to claim 8, wherein the actions further include:
updating the second number in response to an increase in the total number of the multiple storage devices;
determining whether the updated second number is greater than the second number before the update; and
determining at least one updated storage unit group if it is determined that the updated second number is greater than the second number before the update, each storage unit group in the at least one updated storage unit group having the updated second number of storage units.

13. The electronic device according to claim 12, wherein determining at least one updated storage unit group includes:
for each storage unit in the multiple storage units, determining whether the storage unit stores data; and
if it is determined that the storage unit has stored data, determining the storage unit, each of the other storage units in a storage unit group that included the storage unit before the update, and a fourth number of storage units having no data stored as an updated storage unit group, the fourth number being a difference between the updated second number and the second number before the update.

14. The electronic device according to claim 12, wherein the actions further include:
determining a storage unit group included stored data before the update, wherein the stored data included multiple data blocks; and
migrating, based on logical addresses of multiple data blocks included in stored data before the update, a size of the storage unit, and the updated second number, the multiple data blocks sequentially to the at least one updated storage unit group in an order of the logical addresses from small to large.

15. A computer program product tangibly stored on a non-volatile computer-readable medium and including machine-executable instructions, which when executed by a device, cause the device to perform a method, the method comprising:
determining multiple storage units provided by multiple storage devices, each storage unit in the multiple storage units having a storage space allocated from a first number of storage devices among the multiple storage devices;
dividing the multiple storage units into at least one storage unit group based on a total number of the multiple storage devices and the first number, each storage unit group in the at least one storage unit group including a second number of storage units, wherein for each storage unit group in the at least one storage unit group, the storage unit group has a storage space allocated from a third number of storage devices among the multiple storage devices, the third number equaling the first number multiplied by the second number, wherein each storage unit within a single storage unit group has storage space allocated from a unique subset of the multiple storage device; and storing, based on a logical address of to-be-stored data, the to-be-stored data into the at least one storage unit group.

16. The computer program product according to claim 15, wherein dividing the multiple storage units into the at least one storage unit group includes:

determining, based on the total number of the multiple storage devices and the first number, a threshold number of storage unit groups that can be provided by the multiple storage devices;

determining the second number based on the threshold number and the total number of the multiple storage units; and dividing the multiple storage units into the at least one storage unit group based on the second number.

17. The computer program product according to claim 15, wherein storing, based on a logical address of the to-be-stored data, the to-be-stored data into the at least one storage unit group includes:

determining an identifier for a storage unit group based on the logical address of the to-be-stored data, a size of the storage unit, and the second number; and storing the to-be-stored data to a target storage unit group with the identifier in the at least one storage unit group.

18. The computer program product according to claim 17, wherein storing the to-be-stored data to a target storage unit group with the identifier in the at least one storage unit group includes:

storing, in an interlaced manner, multiple sequential data blocks included in the to-be-stored data into a second number of storage units in the target storage unit group.

* * * * *